(12) United States Patent
Kwon et al.

(10) Patent No.: US 8,478,321 B2
(45) Date of Patent: Jul. 2, 2013

(54) APPARATUS AND METHOD FOR ALLOCATING CHANNEL AND POWER IN COMMUNICATION SYSTEM

(75) Inventors: Ho-Joong Kwon, Ansan-si (KR); Soon-Young Yoon, Seoul (KR); June Moon, Seoul (KR); Sung-Woo Park, Yongin-si (KR); Seung-Won Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 13/018,748

(22) Filed: Feb. 1, 2011

(65) Prior Publication Data

US 2011/0190017 A1  Aug. 4, 2011

(30) Foreign Application Priority Data

Feb. 1, 2010 (KR) .................. 10-2010-0009208
Jan. 6, 2011 (KR) .................. 10-2011-0001574

(51) Int. Cl.
*H04W 72/04* (2009.01)
(52) U.S. Cl.
USPC ........... 455/509; 455/450; 455/522; 455/464; 370/395.4; 370/329
(58) Field of Classification Search
USPC .................. 455/509, 450, 69, 522, 501, 464, 455/67.11, 67.16, 134, 135, 226.2, 226.3; 370/395.21, 395.4, 230, 232, 234, 238, 412, 370/329, 267, 203, 208, 319
See application file for complete search history.

(56) References Cited

U.S. PATENT DOCUMENTS

| 2003/0128658 | A1* | 7/2003 | Walton et al. ............... 370/208 |
| 2004/0208183 | A1* | 10/2004 | Balachandran et al. . 370/395.21 |
| 2006/0039312 | A1* | 2/2006 | Walton et al. ............... 370/319 |
| 2006/0146721 | A1* | 7/2006 | Attar et al. .................. 370/238 |
| 2009/0285151 | A1 | 11/2009 | Eidenschink et al. |
| 2009/0312042 | A1 | 12/2009 | Rudrapatna |
| 2010/0009691 | A1 | 1/2010 | Choi et al. |
| 2010/0020757 | A1* | 1/2010 | Walton et al. ............... 370/329 |
| 2010/0144381 | A1* | 6/2010 | Park et al. .................. 455/501 |
| 2011/0243085 | A1* | 10/2011 | Seo et al. .................... 370/329 |

* cited by examiner

*Primary Examiner* — Tan Trinh
(74) *Attorney, Agent, or Firm* — Jefferson IP Law, LLP

(57) ABSTRACT

An apparatus and method for allocating a channel and power by a Base Station (BS) in a communication system are provided. The method includes, performing one of a first scheduling, which uses inter-cell cooperation information received from at least one neighboring BS and a data rate received from each User Equipment (UE), and a second scheduling, which uses both an average data rate for each subchannel computed by accumulating the data rates for a preset time period and the inter-cell cooperation information, selecting a UE to be allocated each subchannel in each subframe based on results of the performed scheduling, computing a power metric for each of the selected UE and a non-selected UE by using the inter-cell cooperation information, the average data rate, an amount of performance change of the selected UE, and the results of the performed scheduling; and allocating power to all UEs including the selected UE and the non-selected UE by preset subframe periods by using the computed power metric.

18 Claims, 6 Drawing Sheets

APPARATUS AND METHOD FOR ALLOCATING CHANNEL AND POWER IN COMMUNICATION SYSTEM

PRIORITY

This application claims the benefit under 35 U.S.C. §119 (a) of a Korean patent application filed in the Korean Intellectual Property Office on Feb. 1, 2010 and assigned Serial No. 10-2010-0009208 and a Korean patent application filed in the Korean Intellectual Property Office on Jan. 6, 2011 and assigned Serial No. 10-2011-0001574 the entire disclosure of which is hereby incorporated by reference.

BACKGROUND OF THE INVENTION

1. Field of the Invention

The present invention relates to a communication system. More particularly, the present invention relates to an apparatus and a method for allocating a channel and power in a multi-cell communication system.

2. Description of the Related Art

In order to efficiently provide high-speed large-capacity services, the next generation communication system needs to maximize frequency efficiency. In order to increase the frequency efficiency, a Wireless Metropolitan Area Network (WMAN) communication system, for example, needs to divide the whole network into multiple cells, and needs to support the reuse of frequency resources in each of the multiple cells. However, when the frequency resources are reused, Inter-Cell Interference (ICI) occurs, which causes significant performance degradation for users who are located on a cell boundary among users in each cell.

The reuse rate of the frequency resources is expressed as a frequency reuse factor. The frequency reuse factor indicates the number of cells, to which a frequency band is distributed. When the frequency reuse factor is set to a value more than "1," frequency efficiency becomes lower, but ICI becomes smaller. Therefore, a Fractional Frequency Reuse (FFR) scheme, in which a frequency reuse rate is controlled for each subchannel by using a trade-off between frequency efficiency and ICI according to the frequency reuse factors, has been proposed for use in the next generation communication system. The FFR scheme refers to a scheme in which a frequency reuse factor is set to "1" for some subchannels and is set to a value more than "1" for the remaining subchannels.

In the FFR scheme, a frequency reuse pattern is determined and fixed during cell planning. However, a frequency reuse pattern for optimizing frequency efficiency changes depending on user distribution in a network, the number of users in each cell of the network, etc. In the FFR scheme, it is impossible to control the frequency reuse pattern in response to changes in the network as described above. Therefore, when the FFR scheme is used, there is a problem in that system performance is degraded. Also, when the FFR scheme is used, it has limitations in performing power control through the frequency reuse pattern. Therefore, there is another problem in that power cannot be efficiently controlled. Consequently, there has been a demand for a scheme for allocating an optimal frequency channel and optimal power in adaptive response to a network state which changes depending on user distribution in a network, the number of users in each cell of the network, etc.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for allocating a channel and power in a communication system.

Another aspect of the present invention is to provide an apparatus and a method for allocating a channel and power by using inter-cell cooperation information received from each neighboring cell in a multi-cell communication system.

In accordance with an aspect of the present invention, a method for allocating a channel and power by a Base Station (BS) in a communication system is provided. The method includes, performing one of a first scheduling, which uses inter-cell cooperation information received from at least one neighboring BS and a data rate received from each User Equipment (UE), and a second scheduling, which uses both an average data rate for each subchannel computed by accumulating the data rates for a preset time period and the inter-cell cooperation information, selecting a UE to be allocated each subchannel in each subframe based on results of the performed scheduling, computing a power metric for each of the selected UE and a non-selected UE by using the inter-cell cooperation information, the average data rate, an amount of performance change of the selected UE, and the results of the performed scheduling, and allocating power to all UEs including the selected UE and the non-selected UE by preset subframe periods by using the computed power metric.

In accordance with another aspect of the present invention, a BS in a communication system is provided. The BS includes, a channel allocator for performing one of a first scheduling, which uses inter-cell cooperation information received from at least one neighboring BS and a data rate received from each UE, and a second scheduling, which uses both an average data rate for each subchannel computed by accumulating the data rates for a preset time period and the inter-cell cooperation information, and for selecting a UE to be allocated each subchannel in each subframe based on results of the performed scheduling, and a power allocator for computing a power metric for each of the selected UE and a non-selected UE by using the inter-cell cooperation information, the average data rate, an amount of performance change of the selected UE, and the results of the first scheduling, and for allocating power to all UEs including the selected UE and the non-selected UE by preset subframe periods by using the computed power metric.

In accordance with another aspect of the present invention, a method for allocating a channel and power by a BS in a communication system is provided. The method includes, performing scheduling by using inter-cell cooperation information received from at least one neighboring BS and channel state information received from each UE, selecting a UE combination including at least one UE to be allocated each subchannel in each subframe based on results of the scheduling, computing a power metric for each of a selected UE and a non-selected UE by using data rate information of the at least one UE estimated based on the channel state information, the inter-cell cooperation information, an amount of performance change of the at least one UE, and the results of the scheduling; and allocating power to all UEs by preset subframe periods by using the computed power metric.

In accordance with another aspect of the present invention, a BS in a communication system is provided. The BS includes, a channel allocator for performing scheduling by using inter-cell cooperation information received from at least one neighboring BS and channel state information received from each UE, and for selecting a UE combination including at least one UE to be allocated each subchannel in each subframe based on results of the scheduling, and a power allocator for computing a power metric for each of a selected UE and a non-selected UE by using data rate information of the at least one UE estimated based on the channel state information, the inter-cell cooperation information, an amount of performance change of the at least one UE, and the results of the scheduling, and for allocating power to all UEs by preset subframe periods by using the computed power metric.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, a description will be made of an exemplary apparatus and method for allocating a frequency channel and power in a multi-cell communication system. Also, herein, a description will be made of an exemplary apparatus and method for allocating a channel and power by using inter-cell cooperation information received from neighboring cells in the multi-cell communication system.

Figure 1:
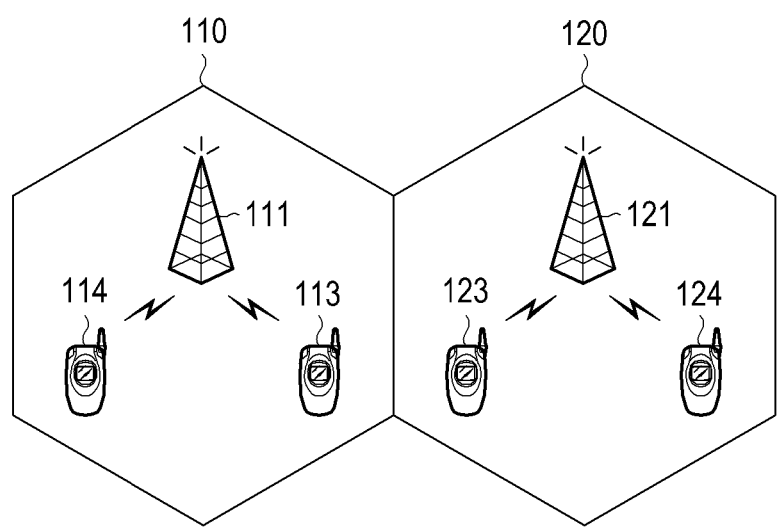
FIG. 1 is an illustrative view showing the structure of a multi-cell communication system according to an exemplary embodiment of the present invention.

FIG. 1 is an illustrative view showing the structure of a multi-cell communication system according to an exemplary embodiment of the present invention.

Referring to FIG. 1, a case where the multi-cell communication system includes 2 neighboring cells, i.e. cell k 110 and cell m 120, will be described as an example.

Cell k 110 includes a first Base Station (BS) 111 for controlling cell k 110 and first User Equipments (UEs) 113 and 114 which receive communication services provided by the first BS 111. Also, cell m 120 includes a second BS 121 for controlling cell m 120 and second UEs 123 and 124 which receive communication services provided by the second BS 121.

The first BS 111 and the second BS 121 exchange inter-cell cooperation information. Thereby, each BS efficiently allocates a channel and power to UEs located in the cell that it controls. In an exemplary embodiment of the present invention, channel allocation is performed in each subframe, and power allocation is performed at predetermined subframe intervals, e.g. in each T subframe. Also, in an exemplary embodiment of the present invention, inter-cell cooperation information is exchanged in each T subframes.

Hereinafter, a description will be made of an exemplary apparatus and method for allocating a channel and power by using inter-cell cooperation information that the first BS 111 receives from the second BS 121, which is a neighboring BS. However, it goes without saying that the apparatus and the method proposed in the embodiment of the present invention may be applied to not only the first BS 111 but also other BSs including the second BS 121. Meanwhile, hereinafter, for the convenience of the description, the first BS 111 is referred to as a "serving BS," and the second BS 121 is referred to as a "neighboring BS."

Hereinafter, the configuration of an exemplary serving BS will be described with reference to FIG. 2.

Figure 2:
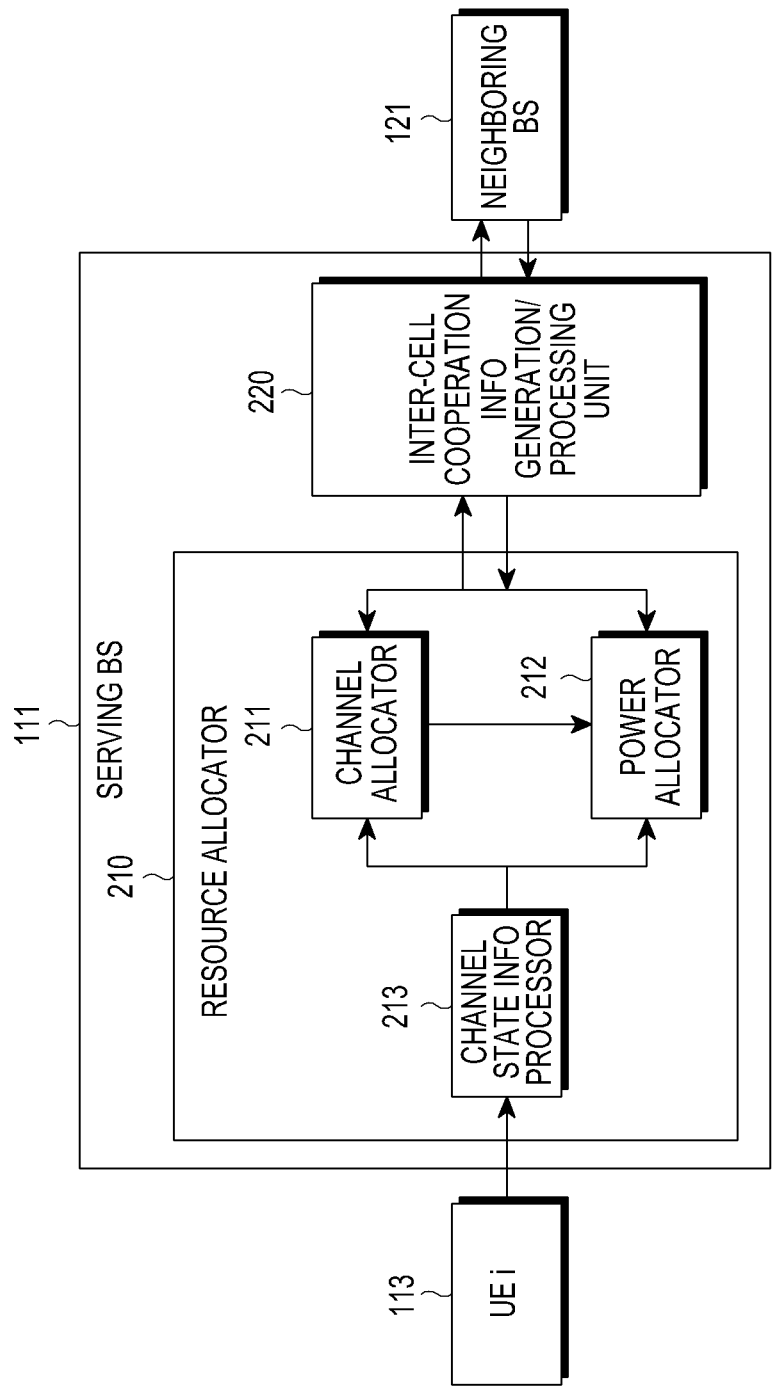
FIG. 2 is a block diagram illustrating the configuration of a serving Base Station (BS) for allocating a channel and power in a multi-cell communication system according to an exemplary embodiment of the present invention.

FIG. 2 is a block diagram illustrating the configuration of a serving BS for allocating a channel and power in a multi-cell communication system according to an exemplary embodiment of the present invention.

Referring to FIG. 2, the serving BS 111 includes a resource allocator 210 and an inter-cell cooperation information generation/processing unit 220. The resource allocator 210 includes a channel state information processor 213, a channel allocator 211, and a power allocator 212.

The operations of the elements in the serving BS 111 change depending on whether the multi-cell communication system is a system (hereinafter, referred to as a "single scheduling system") using a Single-User (SU) scheduling method or a system (hereinafter, referred to as a "multiple scheduling system") using a Multi-user (MU) scheduling method.

The SU scheduling method refers to a scheduling method for allocating a single UE to a single subchannel. The MU scheduling method refers to a scheduling method for simultaneously allocating multiple UEs to a single subchannel by using multiple transmission antennas.

Hereinafter, two exemplary embodiments, into which operations of the elements of the serving BS 111 performed when the multi-cell communication system is the single scheduling system, and operations of the elements of the serving BS 111 performed when the multi-cell communication system is the multiple scheduling system are classified, will be orderly described.

First, a description will be made of the operations of the elements of the serving BS 111 performed when the multi-cell communication system is the single user scheduling system, according to a first exemplary embodiment of the present invention.

The channel state information processor 213 receives transmittable data rate information over each subchannel from an $i^{th}$ UE 113 (hereinafter, referred to as "UE i"), which belongs to cell k, in each subframe. At this time, transmittable data rate information over subchannel j in subframe t of UE i 113 belonging to cell k is expressed as $rate_{ij}^{(k)}(t)$.

The channel state information processor 213 accumulates $rate_{ij}^{(k)}(t)$ received from UE i 113 for a preset time period, and computes $avgRate_{ij}^{(k)}(t)$ which is the average transmittable data rate information over subchannel j in subframe t of UE i 113 belonging to cell k.

Then, the channel state information processor 213 provides the computed $avgRate_{ij}^{(k)}(t)$ to the channel allocator 211. At this time, $avgRate_{ij}^{(k)}(t)$ is updated in each subframe by using equation (1) below.

$$avgRate_{ij}^{(k)}(t) = (1-\lambda_1) \cdot avgRate_{ij}^{(k)}(t-1) + \lambda_1 \cdot rate_{ij}^{(k)}(t) \quad (1)$$

Equation (1) is used to compute a moving average of a data rate. In equation (1), $\lambda_1$ represents a moving average coefficient, and is defined as a rational number ranging from "0" to "1."

The channel allocator 211 performs actual scheduling for allocating a subchannel, over which actual data is to be transmitted, and virtual scheduling for generating inter-cell cooperation information by using the received $rate_{ij}^{(k)}(t)$ and the computed $avgRate_{ij}^{(k)}(t)$. Then, the channel allocator 211 provides the results of the actual scheduling and those of the virtual scheduling to the power allocator 212 and the inter-cell cooperation information generation/processing unit 220.

Herein, the actual scheduling out of the actual scheduling and virtual scheduling will be first described in detail as follows.

For the actual scheduling, the channel allocator 211 selects a UE, which will provide a service for each subchannel, based on $rate_{ij}^{(k)}(t)$ in each subframe by using equation (2) below.

$$i_j^* = \underset{i}{\operatorname{argmax}} \left( \frac{rate_{ij}^{(k)}(t)}{tput_i^{(k)}(t)^\alpha} + c \cdot icicMetric_i^{(k)}(t) \right) \quad (2)$$

Equation (2) is used to select a UE which maximizes an actual scheduling metric. In equation (2), $i_j^*$ represents an index of a UE which is to be allocated subchannel j, $tput_i^{(k)}(t)$ represents a throughput to the end of subframe t of UE i 113 belonging to cell k, c represents a scaling constant, and $\alpha$ represents a parameter for adjusting a trade-off between throughput in the whole cell and throughput on each cell boundary. In this case, an $icicMetric_i^{(k)}$ is expressed by equation (3) below.

$$icicMetric_i^{(k)} = pwr_i^{(k)} \sum_{m \neq k} icicInfo_j^{(m \rightarrow k)} \quad (3)$$

In equation (3), $pwr_i^{(k)}$ represents a ratio of transmission power of UE i 113 and transmission power for a reference signal (or a pilot signal) of the serving BS 111.

Also, in equation (3), $icicInfo_j^{(m \rightarrow k)}$ represents inter-cell cooperation information which is the most recently received from the neighboring BS 121 belonging to cell m by the inter-cell cooperation information generation/processing unit 220 of the serving BS 111 belonging to cell k. Specifically, $icicInfo_j^{(m \rightarrow k)}$ represents the amount of utility change in cell m according to the increase of the average transmission power in cell k over subchannel j.

Herein, the term utility refers to the satisfaction degree of UE i 113 according to a function value of a data rate or throughput allocated to UE i 113. More particularly, the utility is determined by $utility(x)=\log(x)$ when $\alpha=1$, whereas it is determined by $utility(x)=x^{1-\alpha}$ when $\alpha \neq 1$.

Meanwhile, in equation (2), $$\frac{rate_{ij}^{(k)}(t)}{tput_i^{(k)}(t)^\alpha}$$

represents the amount of utility increase in cell k which is obtained when a service is provided to UE i 113, and $c \cdot icicMetric_i^{(k)}(t)$ represents the sum of amounts of utility decreases in cells other than cell k.

Accordingly, the channel allocator 211 performs the actual scheduling by using equation (2), and thereby selects a UE which maximizes a utility of the whole network. However, when an actual scheduling metric of each UE, which has been computed by using equation (2), is less than "0," the channel allocator 211 does not allocate a subchannel to any UE.

Based on the results of the actual scheduling obtained by using equation (2), a throughput of each UE is updated by using equations (4) and (5) below. Specifically, when the channel allocator 211 selects UE i 113, the throughput of UE i 113 is updated by using equation (4) below. On the other hand, when the channel allocator 211 does not select UE i 113, the throughput of UE i 113 is updated by using equation (5) below.

$$tput_i^{(k)}(t+1) = (1-\lambda_2) \cdot tput_i^{(k)}(t) + \lambda_2 \cdot numSubch \cdot rate_{ij}^{(k)}(t) \quad (4)$$

$$tput_i^{(k)}(t+1) = (1-\lambda_2) \cdot tput_i^{(k)}(t) \quad (5)$$

In equations (4) and (5), numSubch represents the number of subchannels, and $\lambda_2$, which represents a moving average coefficient, is defined as a rational number ranging from "0" to "1."

Next, the virtual scheduling will be described as follows.

For the virtual scheduling, the channel allocator 211 selects a UE, to which a communication service is to be provided, based on $avgRate_{ij}^{(k)}(t)$ over each subchannel in each subframe by using equation (6) below.

$$i_j^* = \underset{i}{\operatorname{argmax}} \left( \frac{avgRate_{ij}^{(k)}(t)}{vTput_i^{(k)}(t)^\alpha} + icicMetric_i^{(k)}(t) \right) \quad (6)$$

Equation (6) is used to select a UE which maximizes a virtual scheduling metric. In equation (6), $vTput_i^{(k)}(t)$ represents a throughput to the end of subframe t according to the virtual scheduling of UE i 113 belonging to cell k.

Based on the results of the virtual scheduling obtained in equation (6), a throughput of each UE is updated by using equations (7) and (8) below. Specifically, when the channel allocator 211 selects UE i 113, the throughput of UE i 113 is updated by using equation (7) below. On the other hand, when the channel allocator 211 does not select UE i 113, the throughput of UE i 113 is updated by using equation (8) below. In equations (7) and (8) below, $\lambda_3$ represents a moving average coefficient, and is defined as a rational number ranging from "0" to "1."

$$vTput_i^{(k)}(t+1) = (1-\lambda_3) \cdot tput_i^{(k)}(t) + \lambda_3 \cdot numSubch \cdot avgRate_{ij}^{(k)}(t) \quad (7)$$

$$vTput_i^{(k)}(t+1) = (1-\lambda_3) \cdot tput_i^{(k)}(t) \quad (8)$$

The virtual scheduling metric is used to compute a throughput of UE i 113 when scheduling is performed by using a data average $avgRate_{ij}^{(k)}(t)$ for each subchannel, which is obtained by excluding the influence of channel fading.

Meanwhile, in an exemplary embodiment of the present invention, only the actual scheduling may be performed instead of the virtual scheduling, and a virtual throughput other than $tput_{ij}^{(k)}(t)$ may be managed for each UE. In this case, a virtual throughput is computed by using equations (4) and (5), and whether UE i 113 is selected is determined based on the results of the actual scheduling.

A power metric, which represents the amount of utility change of the whole network according to the increase of $pwr_i^{(k)}$ of UE i 113 belonging to cell k, is expressed as pwrMetric$_i^{(k)}$. In each subframe, the power allocator 212 computes a power metric pwrMetric$_i^{(k)}$ based on the results of the virtual scheduling by using equations (9) and (10) below. When the virtual scheduling is not performed, the results of the actual scheduling are used.

Equation (9) below is used to compute a power metric pwrMetric$_i^{(k)}$ when UE i 113 is selected based on the results of the virtual scheduling. Equation (10) below is used to compute a power metric pwrMetric$_i^{(k)}$ when UE i 113 is not selected based on the results of the virtual scheduling.

$$pwrMetric_i^{(k)}(t+1) = (1-\lambda_4) \cdot pwrMetric_i^{(k)}(t) + \lambda_4 \cdot \left( \frac{derRateOwn_{ij}^{(k)}}{vTput_i^{(k)}(t)^\alpha} + weight_i^{(k)} \cdot \sum_{m \neq k} icicInfo_j^{(m \to k)} \right) \quad (9)$$

$$pwrMetric_i^{(k)}(t+1) = (1-\lambda_4) \cdot pwrMetric_i^{(k)}(t) \quad (10)$$

In equations (9) and (10), $derRateOwn_{ij}^{(k)}$ represents the amount of $avgRate_{ij}^{(k)}$ change for each subchannel of UE i 113 to the amount of $pwr_i^{(k)}$ increase of UE i 113 which is the amount of performance change of UE i 113 according to the change of transmission power of UE i 113 belonging to cell k. The element $\lambda_4$ represents a moving average coefficient, and is defined as a rational number ranging from "0" to "1." The element weight$_i^{(k)}$ represents a weighting factor which is obtained when UE i 113 belonging to cell k considers the amounts of performance changes of other cells to the amount of performance change of cell k.

For example, when there are Quality of Service (QoS) conditions for each UE, a weighting factor weight$_i^{(k)}$ for each UE is initially set to "1." Then, a weighting factor weight$_i^{(k)}$ for a UE, of which a current performance does not satisfy the QoS conditions, is reduced by a predetermined value in each T subframe. On the other hand, a weighting factor weight$_i^{(k)}$ for a UE, of which a current performance satisfies the QoS conditions, is increased by a predetermined value in each T subframe.

Meanwhile, the channel state information processor 213 computes a $derRateOwn_{ij}^{(k)}$ in each T subframe by using equation (11) below. Then, it provides the computed derRateOwn$_{ij}^{(k)}$ to the power allocator 212.

$$derRateOwn_{ij}^{(k)} = \frac{\left(2^{avgRate_{ij}^{(k)}} - 1\right)}{pwr_i^{(k)} \cdot 2^{avgRate_{ij}^{(k)}} \cdot \ln 2} \quad (11)$$

The power allocator 212 determines a transmission power $pwr_i^{(k)}$ for pwrMetric$_i^{(k)} \neq 0$ at the relevant time point in each T subframe based on the power metric pwrMetric$_i^{(k)}$, which has been computed by using equations (9) and (10), by using equations (12) and (13) below. Specifically, when pwrMetric$_i^{(k)} > 0$, the power allocator 212 determines a transmission power $pwr_i^{(k)}$ by using equation (12) below. On the other hand, when pwrMetric$_i^{(k)} < 0$, it determines a transmission power $pwr_i^{(k)}$ by using equation (13) below.

$$pwr_i^{(k)} = \min(pwr_i^{(k)} \cdot \alpha, maxPwr), (\alpha > 1) \quad (12)$$

$$pwr_i^{(k)} = \max(pwr_i^{(k)} \cdot \beta, minPwr), (\beta < 1) \quad (13)$$

In equations (12) and (13), max Pwr represents a maximum value of the transmission power $pwr_i^{(k)}$, min Pwr represents a minimum value of the transmission power $pwr_i^{(k)}$, $\alpha$ represents a real number which is more than "1," and $\beta$ represents a real number which is less than "1." When pwrMetric$_i^{(k)} > 0$, the power allocator 212 allocates power, which is larger than currently-allocated power, to UE i 113. When pwrMetric$_i^{(k)} < 0$, the power allocator 212 allocates power, which is smaller than currently-allocated power, to UE i 113. Also, when pwrMetric$_i^{(k)} = 0$, the power allocator 212 maintains the power which is currently allocated to UE i 113.

The transmission power $pwr_i^{(k)}$ of UE i 113, which has been determined by using equations (12) and (13), is used during the next T subframes. The power allocator 212 transmits data by using power which is obtained by multiplying transmission power of a reference signal by the transmission power $pwr_i^{(k)}$ of UE i 113 selected by scheduling.

The inter-cell cooperation information generation/processing unit 220 of the serving BS 111 belonging to cell k generates icicInfo$_j^{(k \to m)}$ which is to be delivered to the neighboring BS 121 belonging to cell m, by using equations (14) and (15) below. Specifically, when UE i 113 is selected based on the results of the virtual scheduling, the inter-cell cooperation information generation/processing unit 220 updates icicInfo$_j^{(k \to m)}$ in each subframe by using equation (14) below. On the other hand, when none of the UEs are selected based on the results of the virtual scheduling, the inter-cell cooperation information generation/processing unit 220 updates icicInfo$_j^{(k \to m)}$ in each subframe by using equation (15) below. In equations (14) and (15) below, $\lambda_5$ represents a moving average coefficient, and is defined as a rational number ranging from "0" to "1."

$$icicInfo_j^{(k \to m)}(t+1) = \\ (1-\lambda_5) \cdot icicInfo_j^{(k \to m)}(t) + \lambda_5 \cdot \frac{derRateOther_{ij}^{(m \to k)}}{vTput_i^{(k)}(t)^\alpha} \quad (14)$$

$$icicInfo_j^{(k \to m)}(t+1) = (1-\lambda_5) \cdot icicInfo_j^{(k \to m)}(t) \quad (15)$$

The inter-cell cooperation information generation/processing unit 220 transmits icicInfo$_j^{(k \to m)}$ at the relevant time point in each T subframes to the neighboring BS 121.

In equation (14), $\text{derRateOther}_{ij}^{(m \to k)}$ represents the amount of performance change of UE i 113 belonging to the serving cell k according to the change of average transmission power of neighboring cell m. Namely, the element $\text{derRateOther}_{ij}^{(m \to k)}$ represents the amount of $\text{avgRate}_{ij}^{(k)}$ change of UE i 113 to the amount of average transmission power increase for each subchannel of neighboring cell m.

The channel state information processor 213 computes a $\text{derRateOther}_{ij}^{(m \to k)}$ by using equation (16) below, and then provides the computed $\text{derRateOther}_{ij}^{(m \to k)}$ to the inter-cell cooperation information generation/processing unit 220.

$$\text{derRateOther}_{ij}^{(m \to k)} = -\frac{\left(2^{\text{avgRate}_{ij}^{(k)}} - 1\right)^2}{pwr_i^{(k)} \cdot 2^{\text{avgRate}_{ij}^{(k)}} \cdot \ln 2} \cdot \text{ratio}_i^{(k,m)} \quad (16)$$

In equation (16), $\text{ratio}_i^{(k,m)}$ represents a ratio of power of a reference signal, which UE i 113 belonging to cell k receives from cell m, and that of a reference signal, which UE i 113 receives from cell k. UE i 113 measures both a power of the reference signal, which UE i 113 has received from cell k to which UE i 113 itself belongs, and a power of the reference signal which it has received from neighboring cell m. Then, it transmits the measured power values or a ratio of the measured power values to the serving BS 111.

Meanwhile, a $\text{ratio}_i^{(k,m)}$ for cell m, of which a power of the reference signal cannot be measured, is determined as follows. First, the channel state information processor 213 manages, according to cells, a set K for the $N_{neighbor}$ number of neighboring cells which exert the largest influence of Inter-Cell Interference (ICI) on UEs belonging to each cell. The set K is constructed based on powers of reference signals that all the UEs in each cell have received from neighboring cells.

The channel state information processor 213 manages an average transmittable data rate $\text{wAvgRate}_i^{(k)}$ to the whole frequency band of each UE. The channel state information processor 213 updates a $\text{wAvgRate}_i^{(k)}$ in each subframe by using equation (17) below. In equation (17) below, $\lambda_6$ represents a moving average coefficient, and is defined as a rational number ranging from "0" to "1."

$$\text{wAvgRate}_i^{(k)}(t+1) = \quad (17)$$
$$(1-\lambda_6) \cdot \text{wAvgRate}_i^{(k)}(t) + \lambda_6 \cdot \frac{1}{numSubch} \cdot \sum_{j=1}^{numSubch} \text{rate}_{ij}^{(k)}(t)$$

The channel state information processor 213 computes an average Signal-to-Interference Noise Ratio (SINR) $\sin r_i^{(k)}$ to the whole frequency band based on the value of a $\text{wAvgRate}_i^{(k)}$ at the relevant time point in each T subframe by using equations (18) and (19) below. When the number of transmission antennas is "1," the average SINR $\sin r_i^{(k)}$ is expressed by equation (18) below.

$$\sin r_i^{(k)} = 2^{\text{wAvgRate}_i^{(k)}(t)} - 1 \quad (18)$$

Also, when the number of transmission antennas is "2" and transmission using a spatial multiplexing scheme is performed, the average SINR $\sin r_i^{(k)}$ is expressed by equation (19) below.

$$\sin r_i^{(k)} = \begin{cases} 2^{\text{wAvgRate}_i^{(k)}(t)} - 1, & \text{if } \text{wAvgRate}_i^{(k)}(t) \leq a \\ 10^{b\log_{10}\left(2^{\text{wAvgRate}_i^{(k)}(t)} - 1\right)}, & \text{otherwise} \end{cases} \quad (19)$$

In equations (18) and (19), a $\text{wAvgRate}_i^{(k)}$ is computed by the sum of data rates for 2 data streams, and a and b represent parameters for computing an average SINR $\sin r_i^{(k)}$ from an average transmittable data rate.

Meanwhile, a $\text{ratio}_i^{(k \to m)}$ for neighboring cell m, of which a reception power of a reference signal cannot be measured by using equations (18) and (19), is computed by using equations (20) below.

$$\text{ratio}_i^{(k,m)} = \frac{1}{N_{neighbor} - |rsSet^{(k)}|} \left( \frac{1}{\sin r_i^{(k)}} - \sum_{m \in rsSet^{(k)}} \text{ratio}_i^{(k,m)} \right) \quad (20)$$

In equation (20), $rsSet^{(k)}$ represents a set of neighboring cells of which reception powers of reference signals is measured, and $|rsSet^{(k)}|$ represents the number of the neighboring cells belonging to the set $rsSet^{(k)}$ of the neighboring cells.

The inter-cell cooperation information generation/processing unit 220 computes $\text{icicInfo}_j^{(k \to m)}$ for all neighboring cells as inter-cell cooperation information, and transmits the computed $\text{icicInfo}_j^{(k \to m)}$ to all the neighboring cells in each T subframe. However, a transmission time point of the computed $\text{icicInfo}_j^{(k \to m)}$ may be differently set for each of all the neighboring cells.

Hereinafter, a description will be made of operations of elements of the serving BS 111 when a multi-cell communication system according to a second exemplary embodiment of the present invention is the multiple scheduling system.

It is possible to further improve system efficiency when the MU scheduling method is used as compared to when the SU scheduling method is used. In order to use the MU scheduling method, the following particulars must be considered.

First, when the MU scheduling method is used, the performance of each UE is determined by an instantaneous channel state at the relevant time point, simultaneously-transmitted precoding of all UEs at the relevant time point, intra-cell interference and Inter-Cell Interference (ICI) at the relevant time point, etc. Also, subchannel and power allocation must be performed by predicting the performance change of the whole network according to the subchannel allocation and power control.

Second, when subchannels are allocated, a determination must be made of a scheduling metric used to select a combination of UEs which are simultaneously allocated to each subchannel in a particular cell.

Third, when power is allocated, it must be considered to distribute reference power to data of multiple UEs which are simultaneously allocated to each subchannel.

Fourth, a determination must be made of channel state information that each UE must report to a BS, and prediction must be made of performances of the UEs over the relevant subchannel by using the MU scheduling and transmission power allocated to the selected UEs based on the determined channel state information.

Hereinafter, a description will be made of operations of elements of the serving BS 111 which satisfy the four particulars as described above.

After reference power is equally allocated to UEs which are simultaneously allocated to the relevant subchannel, transmission power, which is used when the serving BS 111 transmits data to each UE, is determined by multiplying the reference power by a relative transmission power $pwr_i^{(k)}$ of each UE determined by the channel allocator 211. Namely, a transmission power $P_i^{(k)}$, which is used to transmit data to UE i 113 allocated to subchannel j in cell k, is determined by equation (21) below.

$$P_i^{(k)} = \frac{\overline{P}^{(k)}}{numLayer_j^{(k)}} \cdot pwr_i^{(k)} \qquad (21)$$

In equation (21), $\overline{P}^{(k)}$ represents reference power of the serving BS 111 belonging to cell k, $numLayer_j^{(k)}$ represents the number of UEs which are simultaneously allocated to subchannel j in subframe t determined by the channel allocator 211, $pwr_i^{(k)}$ represents a ratio of transmission power of UE i 113 and transmission power for a reference signal (or a pilot signal) of the serving BS 111.

A transmittable data rate of a UE allocated to a particular subchannel is determined according to how a UE is combined with other UEs which are allocated to the same subchannel. Specifically, the data rate is determined based on precoding and channel characteristics of each UE for reducing interference between the UEs included in a relevant UE combination. When a combination {i} of UEs (i.e. a UE combination $\{i\}_j^{(k)}$) is allocated to subchannel j of cell k in subframe t, a transmittable data rate $rate_{ij}^{(k)}(\{i\}_j^{(k)}, t)$ of UE i 113 included in the UE combination $\{i\}_j^{(k)}$ is determined by using equation (22) below.

$$rate_{ij}^{(k)}(\{i\}_j^{(k)}, t) = \log_2\left(1 + \frac{\left|(w_{ij}^{(k)})^H h_{ij}^{(k,k)}\right|^2 P_i^{(k)}}{\Gamma\left(\sum_{i' \in \{i\}_j^{(k)}, i' \neq i}\left|(w_{i'j}^{(k)})^H h_{ij}^{(k,k)}\right|^2 P_{i'}^{(k)} + \sum_{m \neq k}\sum_{i' \in \{i\}_j^{(m)}}\left|(w_{i'j}^{(m)})^H h_{ij}^{(k,m)}\right|^2 P_{i'}^{(k)} + N\right)}\right) \qquad (22)$$

In equation (22), $w_{ij}^{(k)}$ represents a precoding vector of UE i 113 over subchannel j in cell k, and $w_{i'j}^{(k)}$ represents a precoding vector of UE i' over subchannel j in cell k. Herein, UE i' represents a UE other than UE i 113 included in the UE combination $\{i\}_j^{(k)}$, or a UE included in a UE combination $\{i\}_j^{(m)}$ in cell m. The element $h_{ij}^{(k,m)}$ represents a channel vector between UE i 113 and a neighboring BS 121 belonging to cell m, $h_{ij}^{(k,k)}$ represents a channel vector between UE i 113 and the serving BS 111 belonging to cell k, $P_{i'}^{(k)}$ represents transmission power for transmitting data to UE i' allocated to subchannel j in cell k, and N represents noise power.

Meanwhile, the channel state information processor 213 of the serving BS 111 receives channel state information from UE i 113 in order to estimate a $rate_{ij}^{(k)}(\{i\}_j^{(k)}, t)$. The channel state information includes an SINR which is computed on the assumption that UE i 113 sets transmission power of the serving BS 111 as reference power and only UE i 113 is allocated the relevant subchannel. An SINR is computed by using equation (23) below.

$$sinr_{ij}^{(k)}(t) = \frac{|h_{ij}^{(k,k)}|^2 \overline{P}^{(k)}}{I_{ij}^{(k)} + N} \qquad (23)$$

In equation (23), $sinr_{ij}^{(k)}(t)$ represents an SINR over subchannel j during subframe t of UE i 113 included in cell k, and $I_{ij}^{(k)}$ represents a magnitude of inter-cell interference which occurs when the neighboring BS 121 transmits data by using reference power.

The channel state information processor 213 estimates a transmittable data rate $rate_{ij}^{(k)}(\{i\}_j^{(k)}, t)$ using the computed $sinr_{ij}^{(k)}(t)$. Namely, the channel state information processor 213 estimates the transmittable data rate $rate_{ij}^{(k)}(\{i\}_j^{(k)}, t)$ by using equation (24) below.

$$rate_{ij}^{(k)}(\{i\}_j^{(k)}, t) = \log_2\left(1 + \frac{\left|(w_{ij}^{(k)})^H \hat{h}_{ij}^{(k,m)}\right|^2 sinr_{ij}^{(k)} \frac{pwr_i^{(k)}}{avgNbrPwr_j^{(k)}}}{\Gamma\left(\sum_{i' \in \{i\}_j^{(k)}, i' \neq i}\left|(w_{i'j}^{(k)})^H \hat{h}_{ij}^{(k,m)}\right|^2 sinr_{ij}^{(k)} \frac{pwr_{i'}^{(k)}}{avgNbrPwr_j^{(k)}} + 1\right)}\right) \qquad (24)$$

In equation (24), $\hat{h}_{ij}^{(k)}$ represents a vector which is obtained by normalizing a vector $h_{ij}^{(k)}$, $avgNbrPwr_j^{(k)}$ represents an average value of relative transmission powers to reference powers that neighboring BSs of cell k use over subchannel j, and $pwr_{i'}^{(k)}$ represents a ratio of transmission power of UE i' and transmission power for a reference signal (or a pilot signal) of the serving BS 111.

When the transmittable data rate $rate_{ij}^{(k)}(\{i\}_j^{(k)}, t)$ is estimated as described above, the channel state information processor 213 provides the estimated $rate_{ij}^{(k)}(\{i\}_j^{(k)}, t)$ to the channel allocator 211. Then, the channel allocator 211 determines a combination of UEs which are to be allocated to each subchannel in each subframe by using a scheduling metric which appears in equation (25) below. When there is a combination of UEs for which the value of a scheduling metric is less than "0," the channel allocator 211 does not perform UE allocation to the relevant subchannel.

$$\{i^*\}_j^{(k)} = \underset{\{i\}}{\operatorname{argmax}} \sum_{i \in \{i\}}\left(\frac{rate_{ij}^{(k)}(\{i\}, t)}{tput_i^{(k)}(t)^{\alpha}} + c \cdot icicMetric_{\{i\}}^{(k)}(t)\right) \qquad (25)$$

In equation (25), $\{i^*\}_j^{(k)}$ represents an index of a combination {i} of UEs allocated to subchannel j in cell k, and an $icicMetric_{\{i\}}^{(k)}$ is determined by using equation (26) below.

$$icicMetric_{\{i\}}^{(k)} = \frac{pwr_i^{(k)}}{|\{i\}|}\sum_{m \neq k} icicInfo_j^{(m \to k)} \qquad (26)$$

In equation (26), |{i}| represents the number of users belonging to the combination {i} of the UEs, $icicInfo_j^{(m \to k)}$ represents inter-cell cooperation information which is the most recently received from the neighboring BS 121 belonging to cell m by the inter-cell cooperation information generation/processing unit 220 of the serving BS 111 belonging to cell k. Namely, $icicInfo_j^{(m \to k)}$ represents the amount of utility change in cell m according to the increase of the average transmission power in cell k over subchannel j.

The channel allocator 211 provides in each subframe the results of the scheduling, which have been obtained by using equation (25), to the channel state information processor 213, the power allocator 212, and the inter-cell cooperation information generation/processing unit 220. Also, the channel allocator 211 updates in each subframe a throughput $tput_i^{(k)}(t)$ to the end of subframe t of UE i 113 belonging to cell k. Then, it provides the updated $tput_i^{(k)}(t)$ to the power allocator 212 and the inter-cell cooperation information generation/processing unit 220.

The channel state information processor 213 computes a $derRateOwn_{ij}^{(k)}(\{i^*\}_j^{(k)}, t)$ based on the transmittable data rate $rate_{ij}^{(k)}(\{i^*\}_j^{(k)}, t)$ at the relevant time point in each subframe by using equation (27) below. At this time, $derRateOwn_{ij}^{(k)}(\{i^*\}_j^{(k)}, t)$ represents the amount of $rate_{ij}^{(k)}(\{i^*\}_j^{(k)}, t)$ change over subchannel j to the amount of $pwr_i^{(k)}$ increase of UE i 113.

$$derRateOwn_{ij}^{(k)}(\{i^*\}_j^{(k)}, t) = \frac{2^{rate_{ij}^{(k)}(\{i^*\}_j^{(k)}, t)} - 1}{pwr_i^{(k)} \cdot 2^{rate_{ij}^{(k)}(\{i^*\}_j^{(k)}, t)} \cdot \ln 2} \quad (27)$$

The channel state information processor 213 provides the $derRateOwn_{ij}^{(k)}(\{i^*\}_j^{(k)}, t)$, which has been computed by using equation (27), to the power allocator 212.

Also, the channel state information processor 213 computes a $derRateOther_{ij}^{(k)}(\{i^*\}_j^{(k)}, t)$ based on the transmittable data rate $rate_{ij}^{(k)}(\{i^*\}_j^{(k)}, t)$ at the relevant time point in each subframe by using equation (28) below. At this time, $derRateOther_{ij}^{(k)}(\{i^*\}_j^{(k)}, t)$ represents the amount of $rate_{ij}^{(k)}(\{i^*\}_j^{(k)}, t)$ change of UE i 113 belonging to cell k to the amount of average transmission power increase over subchannel j in neighboring cell m.

$$derRateOther_{ij}^{(m \to k)}(\{i^*\}_j^{(k)}, t) = \quad (28)$$
$$-\frac{\Gamma\left(2^{rate_{ij}^{(k)}(\{i^*\}_j^{(k)}, t)} - 1\right)^2}{pwr_i^{(k)} \cdot 2^{rate_{ij}^{(k)}(\{i^*\}_j^{(k)}, t)} \cdot \ln 2} \cdot ratio_{ij}^{(k,m)}(\{i^*\}_j^{(k)}, t)$$

In equation (28), $ratio_{ij}^{(k)}(\{i^*\}_j^{(k)}, t)$ is expressed by equation (29) below.

$$ratio_{ij}^{(k)}(\{i^*\}_j^{(k)}, t) = \frac{|h_{ij}^{(k,m)}|^2 \overline{P}^{(m)}}{|(w_{ij}^{(k)})^H h_{ij}^{(k,k)}|^2 \overline{P}^{(k)}} \quad (29)$$

The channel state information processor 213 provides the computed $derRateOther_{ij}^{(m \to k)}(\{i^*\}_j^{(k)}, t)$ to inter-cell cooperation information generation/processing unit 220.

The power allocator 212 computes a $pwrMetric_i^{(k)}$ based on the results of the scheduling in each subframe by using equations (30) and (31) below. At this time, $pwrMetric_i^{(k)}$ is a power metric which represents the amount of utility change of the whole network according to the increase of $pwr_i^{(k)}$ of UE i 113 belonging to cell k.

When UE i 113 is selected based on the results of the scheduling, the power allocator 212 computes a $pwrMetric_i^{(k)}$ by using equation (30) below. On the other hand, when UE i 113 is not selected based on the results of the scheduling, the power allocator 212 computes a $pwrMetric_i^{(k)}$ by using equation (31) below. In equations (30) and (31) below, $\lambda_7$ represents a moving average coefficient, and is defined as a rational number ranging from "0" to "1."

$$pwrMetric_i^{(k)}(t+1) = (1 - \lambda_7) \cdot pwrMetric_i^{(k)}(t) + \lambda_7 \cdot \quad (30)$$
$$\left(\frac{derRateOwn_{ij}^{(k)}(\{i^*\}_j^{(k)}, t)}{tput_i^{(k)}(t)^\alpha} + \frac{1}{numLayer_j^{(k)}(t)} \cdot \sum_{m \neq k} icicInfo_j^{(m \to k)'}\right)$$

$$pwrMetric_i^{(k)}(t+1) = (1 - \lambda_7) \cdot pwrMetric_i^{(k)}(t) \quad (31)$$

When $pwrMetric_i^{(k)} > 0$, the power allocator 212 allocates power, which is larger than currently-allocated power, to UE i 113. When $pwrMetric_i^{(k)} < 0$, the power allocator 212 allocates power, which is smaller than currently-allocated power, to UE i 113. Also, when $pwrMetric_i^{(k)} = 0$, the power allocator 212 maintains the power which is currently allocated to UE i 113. The process of allocating power by the power allocator 212 is performed in each T subframes.

The inter-cell cooperation information generation/processing unit 220 receives $icicInfo_j^{(m \to k)}$ from the neighboring BS in each T subframes. Then, it provides the received $icicInfo_j^{(m \to k)}$ to the channel allocator 211 and the power allocator 212.

Also, the inter-cell cooperation information generation/processing unit 220 updates $icicInfo_j^{(k \to m)}$, which is to be transmitted to the neighboring BS 121, based on the results of the scheduling in each subframe by using equations (32) and (33) below.

Namely, when a UE combination is allocated to subchannel j based on the results of the scheduling, the inter-cell cooperation information generation/processing unit 220 updates $icicInfo_j^{(k \to m)}$ by using equation (32) below. On the other hand, when none of UE combinations are allocated to subchannel j based on the results of the scheduling, the inter-cell cooperation information generation/processing unit 220 updates $icicInfo_j^{(k \to m)}$ by using equation (33) below. In equations (32) and (33) below, $\lambda_8$ represents a moving average coefficient, and is defined as a rational number ranging from "0" to "1."

$$icicInfo_j^{(k \to m)}(t+1) = \quad (32)$$
$$(1 - \lambda_8) \cdot icicInfo_j^{(k \to m)}(t) + \lambda_8 \cdot \sum_{i \in \{i^*\}_j^{(k)}} \frac{derRateOther_{ij}^{(m \to k)}(\{i^*\}_j^{(k)}, t)}{tput_i^{(k)}(t)^\alpha}$$

$$icicInfo_j^{(k \to m)}(t+1) = (1 - \lambda_8) \cdot icicInfo_j^{(k \to m)}(t) \quad (33)$$

Then, the inter-cell cooperation information generation/processing unit 220 transmits in each T subframes the updated $icicInfo_j^{(k \to m)}$ to the neighboring BS 121 along with $avgNbrPwr_j^{(m)}$. Next, a method for allocating a channel and power in a multi-cell communication system according to a first exemplary embodiment of the present invention will be described with reference to FIG. 3.

Figure 3:
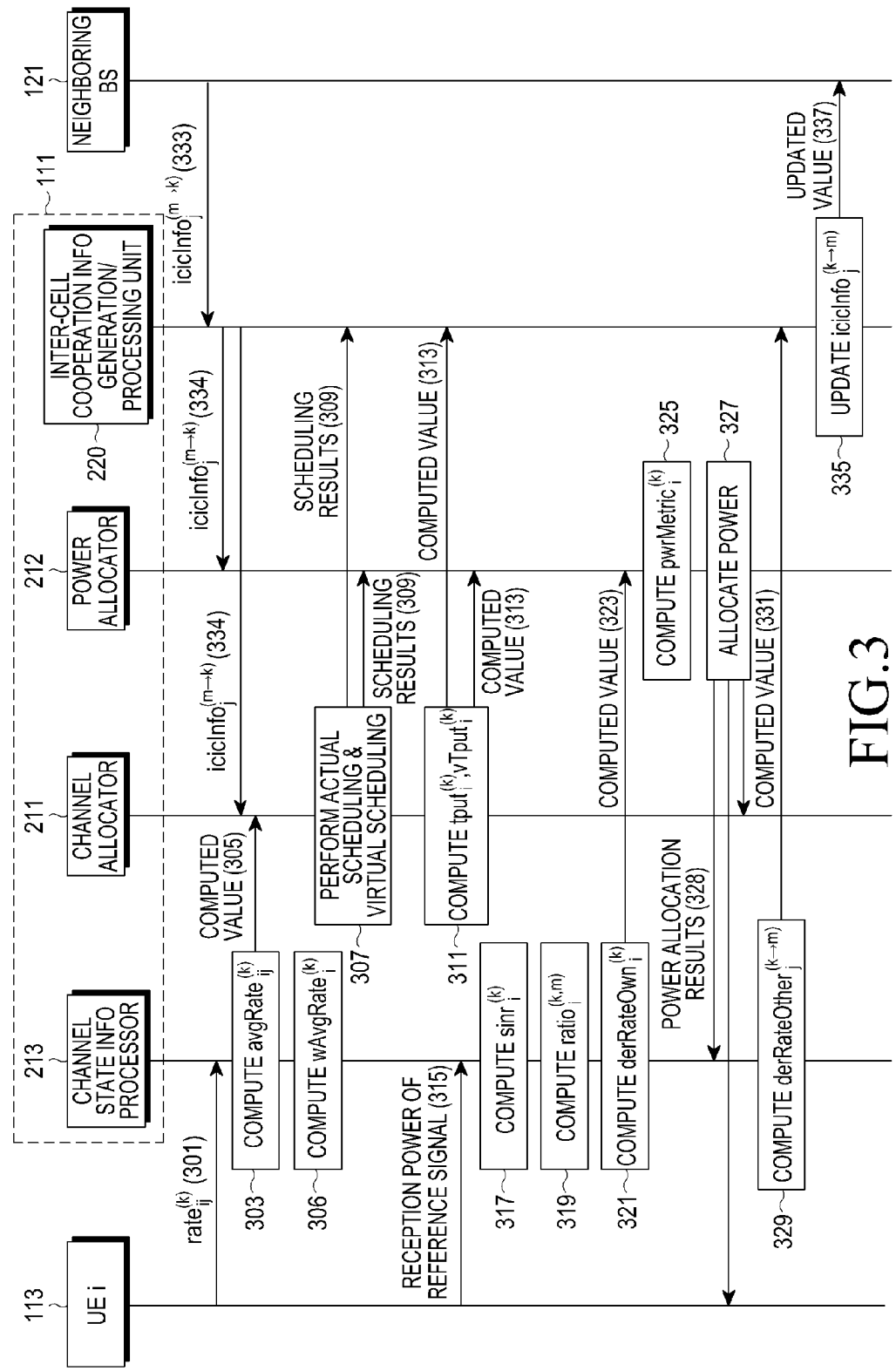
FIG. 3 is a signal flow diagram showing a method for allocating a channel and power in a multi-cell communication system according to an exemplary embodiment of the present invention.

FIG. 3 is a signal flow diagram showing a method for allocating a channel and power in a multi-cell communication system according to an exemplary embodiment of the present invention.

Referring to FIG. 3, UE i 113 transmits, in each subframe, transmittable data rate information $rate_{ij}^{(k)}$ over subchannel j of UE i 113, which belongs to cell k, to a serving BS 111 in step 301.

In step 303, a channel state information processor 213 of the serving BS 111 receives the transmittable data rate information $rate_{ij}^{(k)}$, and computes average transmittable data rate information $avgRate_{ij}^{(k)}$ for each subchannel by using the received rate$_{ij}^{(k)}$. Then, the channel state information processor 213 provides the computed avgRate$_{ij}^{(k)}$ to a channel allocator 211 in step 305. Next, the channel state information processor 213 computes average transmittable data rate information wAvgRate$_{ij}^{(k)}$ to the whole frequency band by using the received rate$_{ij}^{(k)}$ in step 306.

A neighboring BS 121 transmits inter-cell cooperation information icicInfo$_j^{(m \to k)}$ to the serving BS 111 in each T subframes in step 333. Then, the inter-cell cooperation information generation/processing unit 220 of the serving BS 111 receives the inter-cell cooperation information icicInfo$_j^{(m \to k)}$, and provides the received icicInfo$_j^{(m \to k)}$ to a power allocator 212 and the channel allocator 211 in step 334. In this case, the neighboring BS 121 belongs to cell m, and the serving BS 111 belongs to cell k. Therefore, the inter-cell cooperation information icicInfo$_j^{(m \to k)}$ represents the amount of utility change of cell m according to the increase of average transmission power in cell k over subchannel j.

In each subframe, the channel allocator 211 performs actual scheduling by using the received rate$_{ij}^{(k)}$ and the received icicInfo$_j^{(m \to k)}$, and performs virtual scheduling by using the computed avgRate$_{ij}^{(k)}$ and the received icicInfo$_j^{(m \to k)}$ in step 307. Then, the channel allocator 211 provides the results of the actual scheduling and those of the virtual scheduling to the inter-cell cooperation information generation/processing unit 220 and the power allocator 212 in step 309.

Also, in each subframe, the channel allocator 211 computes a throughput tput$_i^{(k)}$ of UE i 113 belonging to cell k based on the results of the actual scheduling, and computes a virtual throughput vTput$_i^{(k)}$ of UE i 113 belonging to cell k based on the results of the virtual scheduling in step 311. Then, the channel allocator 211 provides the values of the computed tput$_i^{(k)}$ and vTput$_i^{(k)}$ to the inter-cell cooperation information generation/processing unit 220 and the power allocator 212 in step 313.

Meanwhile, when measuring reception power for a reference signal from at least one neighboring BS, UE i 113 transmits the measured reception power for the reference signal to the serving BS 111. Then, the serving BS 111 receives the measured reception power for the reference signal through the channel state information processor 213 thereof.

The channel state information processor 213 computes an average SINR sin r$_i^{(k)}$ of the whole frequency band by using average transmittable data rate information wAvgRate$_i^{(k)}$ at the relevant time point in each T subframes in step 317). Then, the channel state information processor 213 computes a ratio$_i^{(k,m)}$ for neighboring cell m, of which a power of a reference signal cannot be measured, by using the computed sin r$_i^{(k)}$ in step 319. Also, the channel state information processor 213 computes in each T subframes a derRateOwn$_{ij}^{(k)}$, which is the amount of avgRate$_{ij}^{(k)}$ change for each subchannel to the amount of pwr$_i^{(k)}$ increase of UE i 113, by using both the average transmittable data rate information avgRate$_{ij}^{(k)}$, which has been computed in step 303, and a ratio pwr$_i^{(k)}$ of transmission power of UE i 113 and that of a reference signal of cell k in step 321. Then, the channel state information processor 213 provides the value of the computed derRateOwn$_{ij}^{(k)}$ to the power allocator 212 in step 323.

In step 325, the power allocator 212 computes in each subframe a pwrMetric$_i^{(k)}$, which is the amount of utility change of the whole network according to the increase of pwr$_i^{(k)}$ of UE i 113, by using the received icicInfo$_j^{(m \to k)}$ and the value of the computed derRateOwn$_{ij}^{(k)}$. Then, the power allocator 212 performs power allocation based on the computed pwrMetric$_i^{(k)}$ in each T subframe in step 327. Namely, when pwrMetric$_i^{(k)}$>0, the power allocator 212 allocates power, which is larger than currently-allocated power, to UE i 113. When pwrMetric$_i^{(k)}$<0, the power allocator 212 allocates power, which is smaller than currently-allocated power, to UE i 113. The results of the power allocation are provided not only to UE i 113 but also to the channel state information processor 213 and the channel allocator 211 in step 328.

Also, the channel state information processor 213 computes in each T subframe a derRateOther$_{ij}^{(m \to k)}$, which is the amount of avgRate$_{ij}^{(k)}$ change of UE i 113 to the amount of transmission power increase for each subchannel in neighboring cell m, by using both avgRate$_{ij}^{(k)}$, which has been computed in step 303, and ratio$_i^{(k,m)}$ which has been computed in step 319 in step 329. Then, the channel state information processor 213 provides the value of the computed derRateOther$_{ij}^{(m \to k)}$ to the inter-cell cooperation information generation/processing unit 220 in step 331.

Then, the inter-cell cooperation information generation/processing unit 220 updates icicInfo$_j^{(k \to m)}$ in each subframe by using the computed vTput$_i^{(k)}$ and derRateOther$_{ij}^{(m \to k)}$ in step 335. Next, it transmits the updated icicInfo$_j^{(k \to m)}$ to the neighboring BS 121 in each T subframes in step 337.

Hereinafter, a method for allocating a channel and power in a multi-cell communication system according to a second exemplary embodiment of the present invention will be described with reference to FIG. 4.

Figure 4:
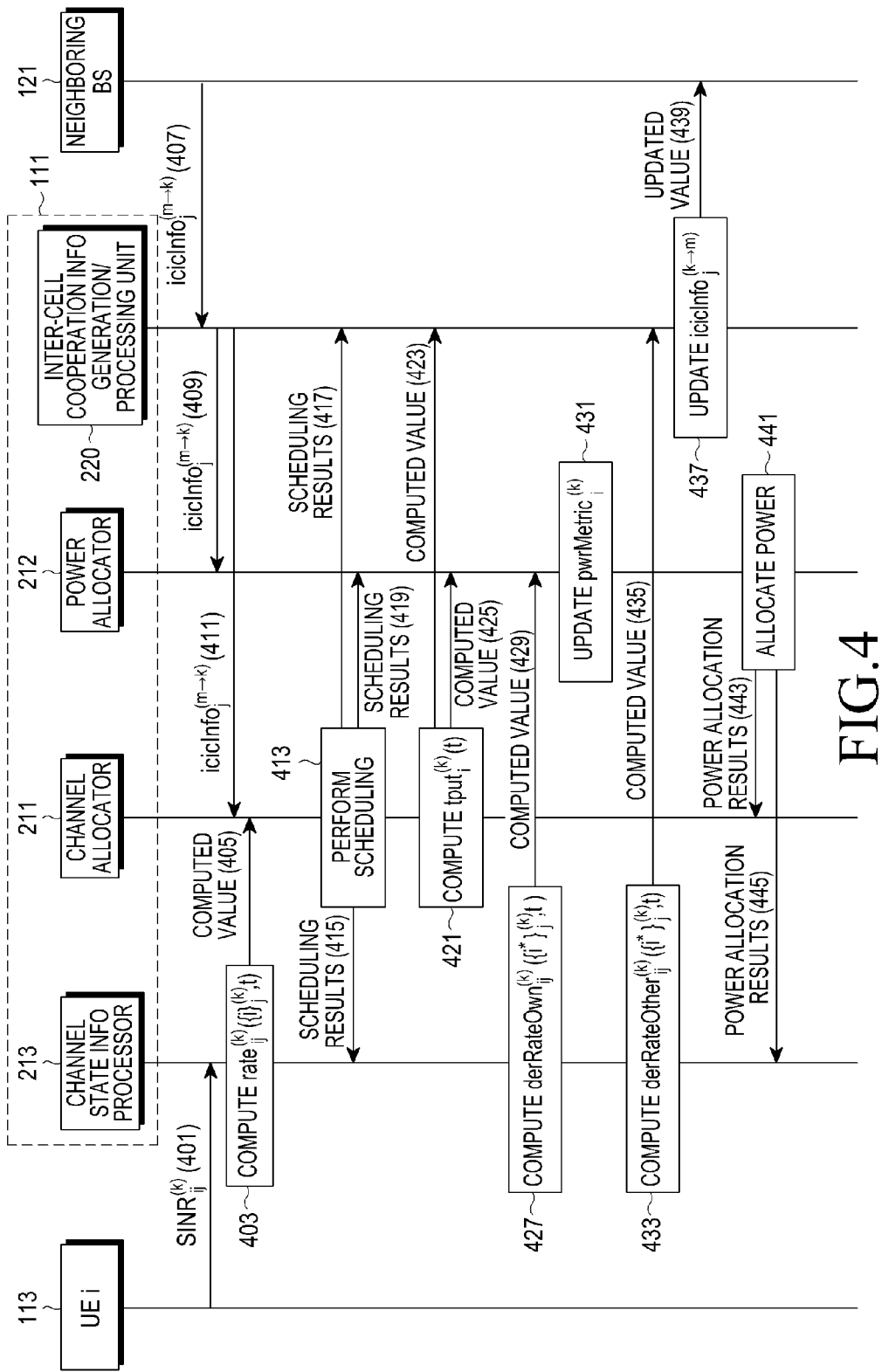
FIG. 4 is a signal flow diagram showing a method for allocating a channel and power in a multi-cell communication system according to an exemplary embodiment of the present invention.

FIG. 4 is a signal flow diagram showing a method for allocating a channel and power in a multi-cell communication system according to an exemplary embodiment of the present invention.

Referring to FIG. 4, UE i 113 transmits channel state information including an SINR sin r$_{ij}^{(k)}$(t) to a serving BS 111 in each subframe in step 401. Then, the channel state information processor 213 of the serving BS 111 receives the channel state information, and computes a transmittable data rate rate$_{ij}^{(k)}$($\{i\}_j^{(k)}$,t) in each subframe by using the SINR sin r$_{ij}^{(k)}$(t) included in the channel state information in step 403. Next, the channel state information processor 213 provides the computed rate$_{ij}^{(k)}$($\{i\}_j^{(k)}$,t) to the channel allocator 211 in step 405.

The channel allocator 211 receives the computed rate$_{ij}^{(k)}$($\{i\}_j^{(k)}$,t) from the channel state information processor 213, and receives inter-cell cooperation information icicInfo$_j^{(m \to k)}$ from an inter-cell cooperation information generation/processing unit 220. At this time, icicInfo$_j^{(m \to k)}$ is inter-cell cooperation information which is received in each T subframes from a neighboring BS 121 in step 407. The inter-cell cooperation information icicInfo$_j^{(m \to k)}$ is received through the inter-cell cooperation information generation/processing unit 220 of the serving BS 111. The inter-cell cooperation information generation/processing unit 220 provides icicInfo$_j^{(m \to k)}$ to the channel allocator 211 and a power allocator 212 in each T subframe in steps 409 and 411.

Then, the channel allocator 211 performs scheduling in each subframe by using the received rate$_{ij}^{(k)}$($\{i\}_j^{(k)}$,t) and icicInfo$_j^{(m \to k)}$ in step 413. Next, the channel allocator 211 provides the results of the scheduling to the channel state information processor 213, the power allocator 212, and the inter-cell cooperation information generation/processing unit 220 in steps 415, 417, and 419.

The channel allocator 211 updates a throughput tput$_i^{(k)}$(t) in each subframe in step 421. Then, the channel allocator 211 provides the updated tput$_i^{(k)}$(t) to the power allocator 212 and the inter-cell cooperation information generation/processing unit 220 in steps 423 and 425.

The channel state information processor 213 computes a derRateOwn$_{ij}^{(k)}$($\{i^*\}_j^{(k)}$,t) by using a transmittable data rate $\text{rate}_{ij}^{(k)}(\{i^*\}_j^{(k)}, t)$ at the relevant time point in each subframe in step 427. Next, the channel state information processor 213 provides the computed $\text{derRateOwn}_{ij}^{(k)}(\{i^*\}_j^{(k)}, t)$ to the power allocator 212 in step 429. Then, the power allocator 212 computes a $\text{pwrMetric}_i^{(k)}$ based on the results of the scheduling in each subframe in step 431. The computed $\text{pwrMetric}_i^{(k)}$ is used to allocate power.

The channel state information processor 213 computes a $\text{derRateOther}_{ij}^{(m \to k)}(\{i^*\}_j^{(k)}, t)$ by using a transmittable data rate $\text{rate}_{ij}^{(k)}(\{i^*\}_j^{(k)}, t)$ at the relevant time point in each subframe in step 433. Next, the channel state information processor 213 provides the computed $\text{derRateOther}_{ij}^{(m \to k)}(\{i^*\}_j^{(k)}, t)$ to the inter-cell cooperation information generation/processing unit 220 in step 435.

Then, the inter-cell cooperation information generation/processing unit 220 updates inter-cell cooperation information $\text{icicInfo}_j^{(k \to m)}$, which is to be transmitted to the neighboring BS 121, in each subframe by using the results of the scheduling, the computed $\text{tput}_i^{(k)}(t)$ and the computed $\text{derRateOther}_{ij}^{(k)}(\{i^*\}_j^{(k)}, t)$ in step 437. Next, the inter-cell cooperation information generation/processing unit 220 transmits in each T subframes the updated $\text{icicInfo}_j^{(k \to m)}$ to the neighboring BS 121 along with $\text{avgNbrPwr}_j^{(m)}$ in step 439.

Meanwhile, the power allocator 212 allocates power to UE i 113 in each T subframes based on the results of the scheduling, the computed $\text{tput}_i^{(k)}(t)$ and the updated $\text{pwrMetric}_i^{(k)}$ in step 441. Then, the power allocator 212 provides the results of the power allocation to the channel state information processor 213 and the channel allocator 211 in steps 443 and 445.

Hereinafter, an operation of a serving BS according to a first exemplary embodiment of the present invention will be described in detail with reference to FIG. 5.

Figure 5:
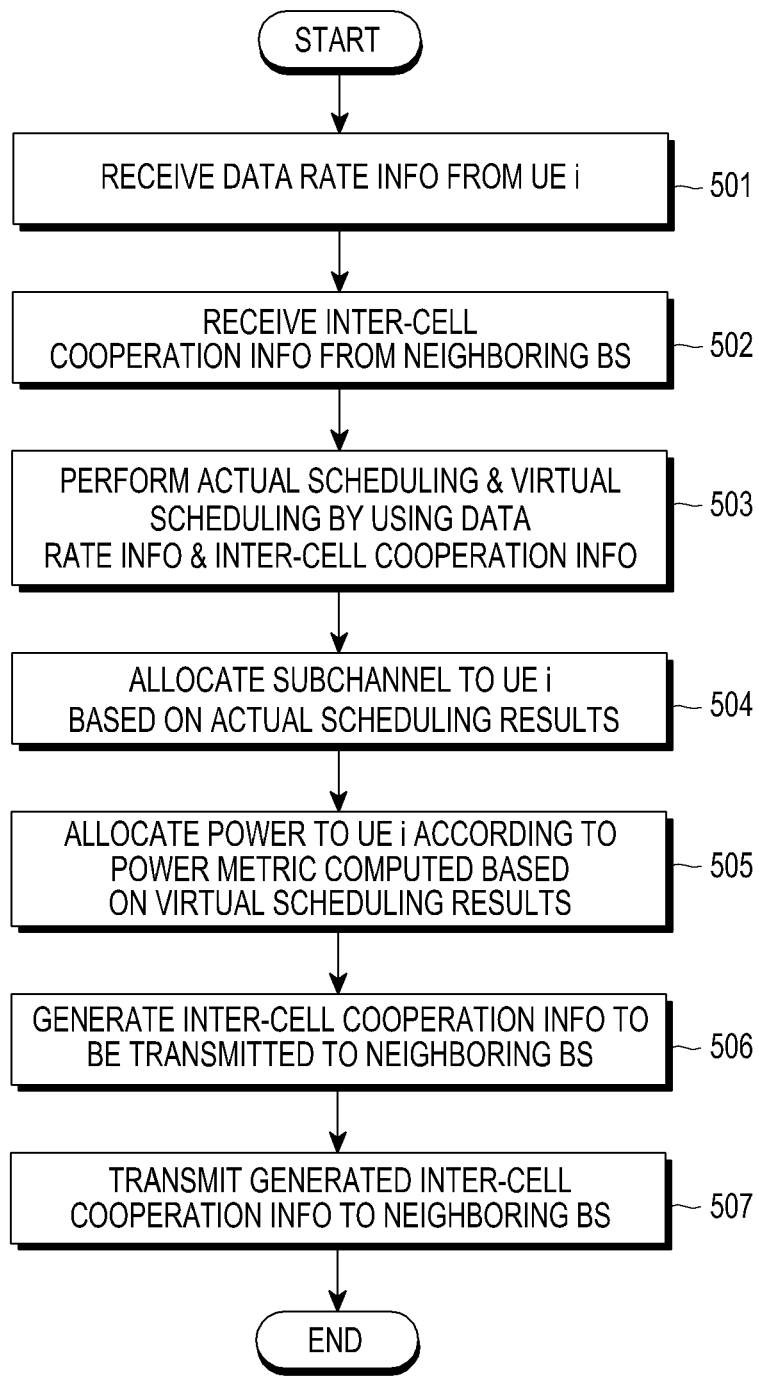
FIG. 5 is a flowchart showing a method for allocating a channel and power by a serving BS according to an exemplary embodiment of the present invention.

FIG. 5 is a flowchart showing a method for allocating a channel and power by a serving BS according to an exemplary embodiment of the present invention.

Referring to FIG. 5, in step 501, the serving BS receives data rate information from UE i. Namely, the serving BS receives $\text{rate}_{ij}^{(k)}$ as the data rate information in each subframe.

In step 502, the serving BS receives inter-cell cooperation information from a neighboring BS. When the neighboring BS belongs to cell m and the serving BS belongs to cell k, the inter-cell cooperation information may be expressed as $\text{icicInfo}_j^{(m \to k)}$, and is received in each T subframe.

In step 503, the serving BS performs actual scheduling and virtual scheduling by using the received data rate information and inter-cell cooperation information. Before performing the actual scheduling and virtual scheduling, the serving BS computes average transmittable data rate information $\text{avgRate}_{ij}^{(k)}$ and an average transmittable data rate $\text{wAvgRate}_i^{(k)}$ by using the received data rate information $\text{rate}_{ij}^{(k)}$.

When completing the computation of $\text{avgRate}_{ij}^{(k)}$ and a $\text{wAvgRate}_i^{(k)}$, in each subframe, the serving BS performs the actual scheduling by using the received $\text{rate}_{ij}^{(k)}$ and $\text{icicInfo}_j^{(m \to k)}$, and performs the virtual scheduling by using the computed $\text{avgRate}_{ij}^{(k)}$ and the received $\text{icicInfo}_j^{(m \to k)}$.

In step 504, the serving BS allocates a subchannel to UE i based on the results of the actual scheduling, and proceeds to step 505. In step 505, the serving BS allocates power to UE i according to a power metric which has been computed based on the results of the virtual scheduling.

Specifically, in each subframe, the serving BS allocates a subchannel to UE i based on the results of the actual scheduling, and updates a throughput $\text{tput}_i^{(k)}$ of UE i. Then, the serving BS updates a virtual throughput $\text{vTput}_i^{(k)}$ of UE i based on the results of the virtual scheduling.

At this time, the updated $\text{vTput}_i^{(k)}$ is used for allocating power to UE i and generating inter-cell cooperation information which is to be transmitted to the neighboring BS. When the virtual scheduling is not performed, the updated $\text{tput}_i^{(k)}$ is used instead of $\text{vTput}_i^{(k)}$. Namely, the virtual scheduling may not be performed in some exemplary embodiments of the present invention. In these cases, the serving BS uses the results of the actual scheduling instead of those of the virtual scheduling.

Meanwhile, in each T subframes, the serving BS computes an $\sin r_i^{(k)}$ by using $\text{wAvgRate}_i^{(k)}$, and computes a $\text{ratio}_i^{(k,m)}$ by using the computed $\sin r_i^{(k)}$.

Then, the serving BS computes a $\text{derRateOwn}_{ij}^{(k)}$ by using a ratio $\text{pwr}_i^{(k)}$ of transmission power of UE i and that of a reference signal of cell k. At this time, $\text{derRateOwn}_{ij}^{(k)}$ represents the amount of $\text{avgRate}_{ij}^{(k)}$ change for each subchannel to the amount of $\text{pwr}_i^{(k)}$ increase.

The serving BS computes a $\text{pwrMetric}_i^{(k)}$, which is the amount of utility change of the whole network according to the increase of $\text{pwr}_i^{(k)}$, in each subframe by using the received $\text{icicInfo}_j^{(m \to k)}$ and the computed $\text{derRateOwn}_{ij}^{(k)}$. Then, the serving BS performs power allocation in each T subframes based on the computed $\text{pwrMetric}_i^{(k)}$.

Specifically, when $\text{pwrMetric}_i^{(k)} > 0$, the serving BS allocates power, which is larger than currently-allocated power, to UE i. When $\text{pwrMetric}_i^{(k)} < 0$, the serving BS allocates power, which is smaller than currently-allocated power, to UEi.

In step 506, the serving BS generates inter-cell cooperation information that it will transmit to the neighboring BS. Namely, the serving BS computes a $\text{derRateOther}_{ij}^{(k)}$ which is the amount of $\text{avgRate}_{ij}^{(k)}$ change of UE i to the amount of transmission power increase for each subchannel in neighboring cell m by using $\text{avgRate}_{ij}^{(k)}$ and $\text{ratio}_i^{(k,m)}$ which is computed in each T subframes. Then, in each subframe, the serving BS updates $\text{icicInfo}_j^{(k \to m)}$ by using the updated $\text{vTput}_i^{(k)}$ and the computed $\text{derRateOther}_{ij}^{(m \to k)}$, and thereby generates inter-cell cooperation information that it will transmit to the neighboring BS.

In step 507, the serving BS transmits the generated inter-cell cooperation information to the neighboring BS.

Hereinafter, an operation of a serving BS according to a second exemplary embodiment of the present invention will be described in detail with reference to FIG. 6.

Figure 6:
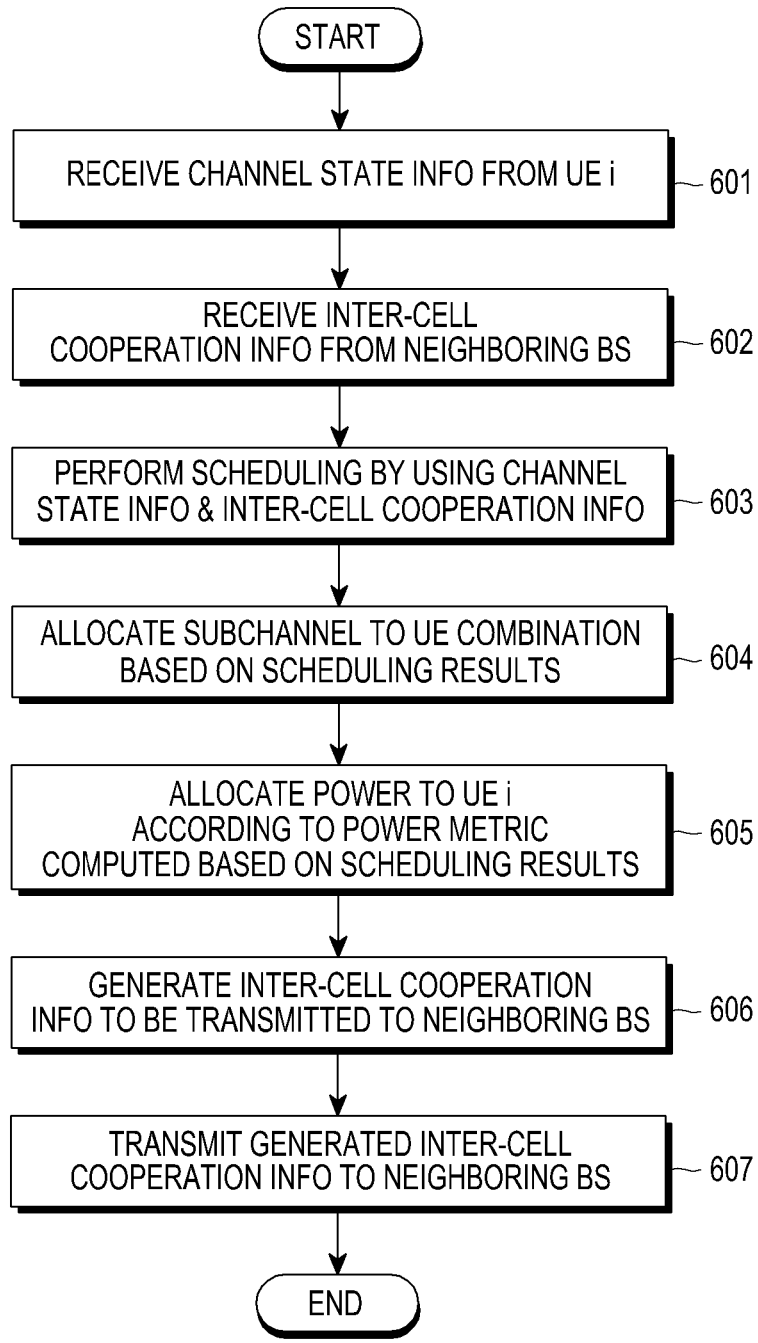
FIG. 6 is a flowchart showing a method for allocating a channel and power by a serving BS according to an exemplary embodiment of the present invention.

FIG. 6 is a flowchart showing a method for allocating a channel and power by a serving BS according to an exemplary embodiment of the present invention.

Referring to FIG. 6, in step 601, the serving BS receives channel state information from UE i in each subframe. The channel state information includes $\sin r_{ij}^{(k)}(t)$. In step 602, the serving BS receives inter-cell cooperation information from a neighboring BS. At this time, the inter-cell cooperation information is expressed as $\text{icicInfo}_j^{(m \to k)}$, and is received by the serving BS in each T subframes.

In step 603, the serving BS performs scheduling by using the received channel state information and the inter-cell cooperation information.

Specifically, the serving BS computes $\text{rate}_{ij}^{(k)}(\{i\}_j^{(k)}, t)$ by using $\sin r_{ij}^{(k)}(t)$ included in the channel state information. Then, the serving BS performs scheduling by using the computed $\text{rate}_{ij}^{(k)}(\{i\}_j^{(k)}, t)$ and the received $\text{icicInfo}_j^{(m \to k)}$.

When a subchannel is allocated to a combination of UEs, which include UE i, based on the results of the scheduling in step 604, the serving BS updates a throughput $\text{tput}_i^{(k)}(t)$ to the end of subframe t of UE i based on the results of the scheduling.

Then, the serving BS computes a $\text{derRateOwn}_{ij}^{(k)}(\{i^*\}_j^{(k)}, t)$ which is the amount of $\text{rate}_{ij}^{(k)}(\{i^*\}_j^{(k)}, t)$ change over subchannel j to the amount of $\text{pwr}_i^{(k)}$ increase of UE i.

In step 605, the serving BS allocates power to the UEs according to a power metric, which has been computed based on the results of the scheduling. Namely, when the power metric, which has been computed based on the results of the scheduling, is expressed as $\text{pwrMetric}_i^{(k)}$, the serving BS allocates power to the combination of the UEs based on whether $\text{pwrMetric}_i^{(k)} > 0$, $\text{pwrMetric}_i^{(k)} < 0$ or $\text{pwrMetric}_i^{(k)} = 0$.

In step 606, the serving BS generates inter-cell cooperation information that it will transmit to the neighboring BS. Specifically, the serving BS computes a $\text{derRateOther}_{ij}^{(m \to k)}(\{i^*\}_j^{(k)}, t)$ based on the $\text{rate}_{ij}^{(k)}(\{i^*\}_j^{(k)}, t)$, and generates $\text{icicInfo}_j^{(k \to m)}$ as inter-cell cooperation information, which it will transmit to the neighboring BS, based on the computed $\text{derRateOther}_{ij}^{(m \to k)}(\{i^*\}_j^{(k)}, t)$ and the results of the scheduling. In step 607, the serving BS transmits the generated inter-cell cooperation information $\text{icicInfo}_j^{(k \to m)}$ to the neighboring BS.

According to the exemplary embodiments as described above, each BS generates inter-cell cooperation information based on channel state information that each BS has received from users, and exchanges the generated inter-cell cooperation information with a neighboring BS. Then, each BS allocates a channel and power based on inter-cell cooperation information received from the neighboring BS. As a result, it is possible to minimize interference between neighboring cells and improve frequency efficiency. Also, it is possible to allocate a channel and power in adaptive response to a real-time network state such as user distribution, the number of users in each cell, etc.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating a channel and power by a Base Station (BS) in a communication system, the method comprising:
    performing one of a first scheduling, which uses inter-cell cooperation information received from at least one neighboring BS and a data rate received from each User Equipment (UE), and a second scheduling, which uses both an average data rate for each subchannel computed by accumulating the data rates for a preset time period and the inter-cell cooperation information;
    selecting a UE to be allocated each subchannel in each subframe based on results of the performed scheduling;
    computing a power metric for each of the selected UE and a non-selected UE by using the inter-cell cooperation information, the average data rate, an amount of performance change of the selected UE, and the results of the performed scheduling; and
    allocating power to all UEs including the selected UE and the non-selected UE by preset subframe periods by using the computed power metric.

2. The method as claimed in claim 1, further comprising:
    generating inter-cell cooperation information, which is to be transmitted to the at least one neighboring BS, based on the results of the performed scheduling and an amount of performance change of the selected UE according to a change of an average transmission power of the at least one neighboring BS; and
    transmitting the generated inter-cell cooperation information to the at least one neighboring BS,
    wherein the amount of the performance change of the selected UE according to the change of the average transmission power of the at least one neighboring BS is determined based on both a ratio between a power of a reference signal, which the selected UE receives from the at least one neighboring BS, and a power of a reference signal, which the selected UE receives from the BS, and an average Signal-to-Interference Noise Ratio (SINR) to a whole frequency band which the BS uses.

3. The method as claimed in claim 1, wherein the inter-cell cooperation information includes information about an amount of utility change of the at least one neighboring BS according to an increase of an average transmission power of the BS, and the utility represents a satisfaction degree of a corresponding UE according to a throughput allocated to the corresponding UE.

4. The method as claimed in claim 1, wherein the allocating of power to all UEs comprises:
    allocating more power than currently allocated to the selected UE, if the computed power metric is more than 0; and
    allocating less power than currently allocated to the selected UE, if the computed power metric is less than 0.

5. The method as claimed in claim 1, wherein the amount of the performance change of the selected UE includes an amount of performance change of the selected UE according to a change of a transmission power ratio between the selected UE and the BS.

6. A Base Station (BS) in a communication system, the BS comprising:
    a channel allocator for performing one of a first scheduling, which uses inter-cell cooperation information received from at least one neighboring BS and a data rate received from each User Equipment (UE), and a second scheduling, which uses both an average data rate for each subchannel computed by accumulating the data rates for a preset time period and the inter-cell cooperation information, and for selecting a UE to be allocated each subchannel in each subframe based on results of the performed scheduling; and
    a power allocator for computing a power metric for each of the selected UE and a non-selected UE by using the inter-cell cooperation information, the average data rate, an amount of performance change of the selected UE, and the results of the first scheduling, and for allocating power to all UEs including the selected UE and the non-selected UE by preset subframe periods by using the computed power metric.

7. The BS as claimed in claim 6, further comprising:
    an inter-cell cooperation information generation/processing unit for generating inter-cell cooperation information, which is to be transmitted to the at least one neighboring BS, based on the results of the performed scheduling and an amount of performance change of the selected UE according to a change of an average transmission power of the at least one neighboring BS, and for transmitting the generated inter-cell cooperation information to the at least one neighboring BS,
    wherein the amount of the performance change of the selected UE according to the change of the average transmission power of the at least one neighboring BS is determined based on both a ratio of a power of a reference signal, which the selected UE receives from the at least one neighboring BS, and a power of a reference signal, which the selected UE receives from the BS, and an average Signal-to-Interference Noise Ratio (SINR) to a whole frequency band which the BS uses.

8. The BS as claimed in claim 6, wherein the inter-cell cooperation information includes information about an amount of utility change of the at least one neighboring BS according to an increase of an average transmission power of the BS, and the utility represents a satisfaction degree of a corresponding UE according to a throughput allocated to the corresponding UE.

9. The BS as claimed in claim 6, wherein the power allocator allocates more power than currently allocated to the selected UE, if the computed power metric is more than 0, and allocates less power than currently allocated to the selected UE, if the computed power metric is less than 0.

10. The BS as claimed in claim 6, wherein the amount of the performance change of the selected UE includes an amount of performance change of the selected UE according to a change of a transmission power ratio between the selected UE and the BS.

11. A method for allocating a channel and power by a Base Station (BS) in a communication system, the method comprising:
    performing scheduling by using inter-cell cooperation information received from at least one neighboring BS and channel state information received from each User Equipment (UE);
    selecting a UE combination including at least one UE to be allocated each subchannel in each subframe based on results of the scheduling;
    computing a power metric for each of a selected UE and a non-selected UE by using data rate information of the at least one UE estimated based on the channel state information, the inter-cell cooperation information, an amount of performance change of the at least one UE, and the results of the scheduling; and
    allocating power to all UEs by preset subframe periods by using the computed power metric.

12. The method as claimed in claim 11, wherein the inter-cell cooperation information includes information about an amount of utility change of the at least one neighboring BS according to an increase of an average transmission power of the BS, and the utility represents a satisfaction degree of a corresponding UE according to a throughput allocated to the corresponding UE.

13. The method as claimed in claim 11, further comprising:
    generating inter-cell cooperation information, which is to be transmitted to the at least one neighboring BS, based on the results of the scheduling and an amount of performance change of the at least one UE according to a change of an average transmission power of the at least one neighboring BS; and
    transmitting the generated inter-cell cooperation information to the at least one neighboring BS.

14. The method as claimed in claim 11, wherein the amount of the performance change of the selected UE includes an amount of performance change of the selected UE according to a change of a transmission power ratio between the selected UE and the BS.

15. A Base Station (BS) in a communication system, the BS comprising:
    a channel allocator for performing scheduling by using inter-cell cooperation information received from at least one neighboring BS and channel state information received from each User Equipment (UE), and for selecting a UE combination including at least one UE to be allocated each subchannel in each subframe based on results of the scheduling; and
    a power allocator for computing a power metric for each of a selected UE and a non-selected UE by using data rate information of the at least one UE estimated based on the channel state information, the inter-cell cooperation information, an amount of performance change of the at least one UE, and the results of the scheduling, and for allocating power to all UEs by preset subframe periods by using the computed power metric.

16. The BS as claimed in claim 15, wherein the inter-cell cooperation information includes information about an amount of utility change of the at least one neighboring BS according to an increase of an average transmission power of the BS, and the utility represents a satisfaction degree of a corresponding UE according to a throughput allocated to the corresponding UE.

17. The BS as claimed in claim 15, further comprising:
    an inter-cell cooperation information generation/processing unit for generating inter-cell cooperation information, which is to be transmitted to the at least one neighboring BS, based on the results of the scheduling and an amount of performance change of the at least one UE according to a change of an average transmission power of the at least one neighboring BS, and for transmitting the generated inter-cell cooperation information to the at least one neighboring BS.

18. The BS as claimed in claim 15, wherein the amount of the performance change of the selected UE includes an amount of performance change of the selected UE according to a change of a transmission power ratio between the selected UE and the BS.

* * * * *